G. D. LAWSON.
FOOT OPERATED ACCELERATOR.
APPLICATION FILED AUG. 16, 1920.
1,407,695.
Patented Feb. 28, 1922.
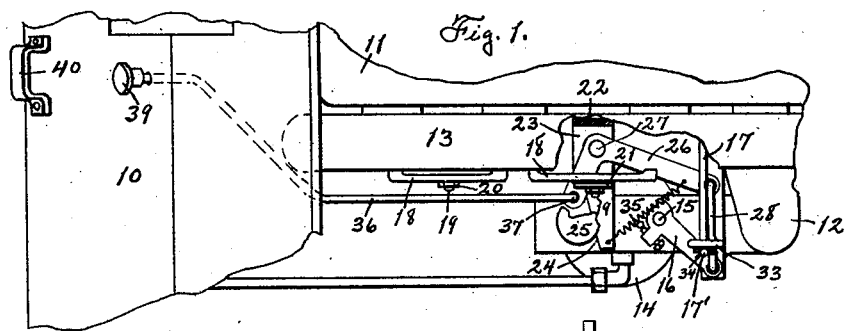
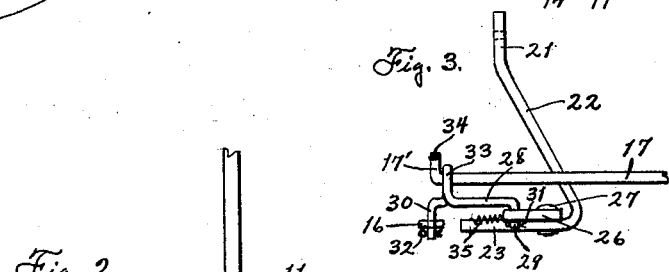
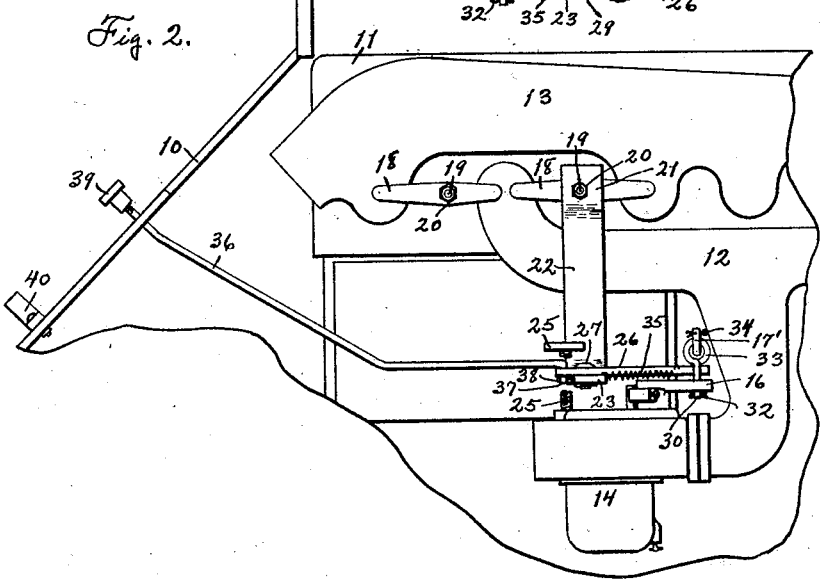
INVENTOR:
G. D. LAWSON
By
Earl M. Sinclair
Att'y.

UNITED STATES PATENT OFFICE.

GEORGE D. LAWSON, OF POCAHONTAS, IOWA.

FOOT-OPERATED ACCELERATOR.

1,407,695. Specification of Letters Patent. Patented Feb. 28, 1922.

Application filed August 16, 1920. Serial No. 404,032.

*To all whom it may concern:*

Be it known that I, GEORGE D. LAWSON, a citizen of the United States of America, and resident of Pocahontas, Pocahontas County, Iowa, have invented a new and useful Foot-Operated Accelerator, of which the following is a specification.

The object of this invention is to provide improved auxiliary throttle-controlling mechanism, operable by foot pressure, for opening the throttle of an internal combustion engine independently of the use of the ordinary manually operated throttle lever.

A further object of this invention is to provide improved means for mounting a foot-accelerator device on and relative to an internal combustion engine.

My invention consists in the construction, arrangement and combination of elements hereinafter set forth, pointed out in my claims and illustrated by the accompanying drawing, in which—

Figure 1 is a plan illustrating a portion of a motor vehicle and its motor equipped with my improved accelerator. Figure 2 is a side elevation of the same, partly in section. Figure 3 is a front elevation, on an enlarged scale, of those portions of the device adjacent the carbureter.

In the drawings I have shown the accelerator applied as an attachment to a well known make of automobile having an inclined foot-board 10 and a power plant including an engine block 11, intake manifold 12, exhaust manifold 13, and carbureter 14 having a throttle valve stem 15 to which is attached a lever 16 operable by a transversely extending rod 17 operated in turn by a hand lever (not shown) on the steering column. The transverse rod 17 has at its end a hook or bend 17' extending through a hole in the outer end of the lever 16. The inlet and exhaust manifolds are held in place relative to the engine block 11 by means of clips 18 through which pass threaded studs 19 seated in the engine block, nuts 20 being mounted on said studs to hold the clips thereon.

A supporting bar or strap is provided and has an upper vertical portion 21, an inclined portion 22 extending downwardly and laterally therefrom, and a horizontal portion 23 extending outwardly from the lower end of said inclined portion. The upper vertical portion 21 of the support is apertured and is adapted to be mounted on one of the studs 19 which is located directly above the carbureter 14, by removal of the nut 20 thereof, and when said nut is replaced the support and devices carried thereby are held firmly and securely in place on and relative to the engine block. When so mounted the inclined portion 22 extends laterally beneath a portion of the inlet manifold 12, and the horizontal portion 23 projects outwardly from the engine block just above the carbureter. A portion of the horizontal portion 23 is cut away at 24 so that the support may be mounted very close to and yet not interfere with the needle valve stem 25 of the carbureter. A bell-crank lever 26 is mounted on the horizontal portion 23 of the support and is pivoted to the inner end of said portion by a rivet 27, or other suitable member. A link 28 is provided, which has downwardly extending studs 29, 30 at its respective ends. The stud 29 at the innermost end of the link 28 passes through a hole in the forwardly extending arm of the bell-crank lever 26, and is secured as by a cotter key or pin 31. The stud 30 at the outer end of the link 28 passes downwardly through the hole in the outer end of the throttle lever 16, from which hole the transverse rod 17 is removed for the purpose of installing my attachment, said stud being secured in place by a cotter key or pin 32. Between its ends, but near its outer end, the link 28 is formed with an upstanding eye member 33, through which the hooked end 17' of the transverse rod 17 is passed freely and slidably, and secured by a cotter key or pin 34. A coil spring 35 is secured at one end to the forwardly extending arm of the bell-crank lever 26 and at its opposite end to the outer end of the horizontal portion 23 of the supporting bar. It is the function of the coil spring 35 to hold the bell-crank lever in such position that, acting through the link 28 and throttle lever 16, the throttle valve having the stem 15 is turned to closing position, and the supply of fuel mixture to the cylinders through the manifold 12 is greatly reduced or entirely cut off.

An operating rod 36 is provided and is extended slidably through the foot board 10 of the vehicle. The forward end of the operating rod 36 is formed with a downturned portion or stud 37 extended through a hole in the rear arm of the bell-crank lever 26, and secured as by a cotter key or pin 38.

The rear end of the operating rod 36 preferably is provided with a head or knob 39 adapted to receive pressure of the foot of an operator or driver. A foot rest 40 may be and preferably is mounted on the foot board 10 at the rear of the upper end of the operating rod, on which the operator's foot may rest while applying pressure to the operating rod with his toe. The operating rod 36 is inclined downwardly between its ends and also offset laterally so that the upper end may be adjacent the driver's seat while the lower or forward end avoids the engine block and is carried into position for attachment as hereinbefore stated.

In practical use, the throttle valve may be operated as commonly provided, by means of the hand lever on the steering column, lateral movement of the transverse rod 17 in one direction being communicated, as ordinarily, to an opening movement of the throttle; and when pressure is relaxed on such rod the throttle is closed by means of the action of the spring 35.

In addition to such hand-operated movement of the throttle, a foot-operated control is provided through the operating rod 36 of my attachment. Forward pressure on said rod results in an oscillation of the bell-crank lever 26, storing power in the spring 35, inward draft on the link 28, and oscillation of the throttle lever 16 to open the throttle. In such movement of the link 28 the eye member 33 thereof slides freely on the transverse rod 17, so that the position of said rod, and of the hand throttle control, is not disturbed, and such foot operation is exercised independently of the hand control. When pressure on the operating rod 36 is relaxed the throttle devices are returned to closing position by the action of the spring 35.

I am aware that other foot-operated accelerators have been provided and patented, which are especially applicable to the type of vehicle for which mine has been produced. I wish, however, to call particular attention to the manner in which I have mounted my operating devices on and relative to the power plant, and also to the fact that it is self-contained, the spring 35 not being attached to any part of the vehicle frame but carried wholly by the attachment. I also call attention to the provision and location of the bell-crank lever and the link 28, and their relation to the usual parts of the power plant.

I claim as my invention—

1. In a motor vehicle having an engine block, a carbureter located at one side thereof, and a manifold connecting said carbureter and engine block and attached to the latter by securing means, an accelerator comprising a supporting bar secured at one end to said engine block by said manifold securing means, said supporting bar having a horizontal portion extending across the top of said carbureter, a bell-crank lever fulcrumed on the horizontal portion of said supporting bar, a foot-operated rod for oscillating said bell-crank lever in one direction, a spring for oscillating said lever in the opposite direction, and a link pivotally connecting said bell-crank lever to the throttle lever of said carbureter.

2. In a motor vehicle having an engine block, a carburetor located at one side thereof, and a manifold connecting said carburetor and engine block and attached to the latter by securing means, an accelerator comprising a supporting bar having a straight vertical portion adapted to be secured to said engine block by said manifold securing means and also formed with an inclined portion adapted to extend laterally beneath a portion of said manifold and also having a horizontal portion at the lower end of said inclined portion adapted to extend outwardly above said carburetor, a lever fulcrumed on said horizontal portion, a foot-operated rod for oscillating said lever in one direction, a spring for oscillating said lever in the opposite direction, and a link pivotally connecting said lever to the throttle lever of said carburetor.

Signed at Pocahontas, in the county of Pocahontas and State of Iowa, this 24 day of July, 1920.

GEORGE D. LAWSON.